(12) United States Patent
Thexton et al.

(10) Patent No.: US 7,495,879 B2
(45) Date of Patent: Feb. 24, 2009

(54) SOLID-STATE MAGNET CONTROL

(76) Inventors: Andrew S. Thexton, 8845 Three Notch Rd., Troy, VA (US) 22974; Eric S. Christenson, 8845 Three Notch Rd., Troy, VA (US) 22974

( * ) Notice: Subject to any disclaimer, the term of this patent is extended or adjusted under 35 U.S.C. 154(b) by 341 days.

(21) Appl. No.: 11/049,902

(22) Filed: Feb. 4, 2005

(65) Prior Publication Data

US 2006/0176635 A1    Aug. 10, 2006

(51) Int. Cl.
H01H 47/00    (2006.01)
(52) U.S. Cl. ................................... 361/144
(58) Field of Classification Search .............. 335/290; 361/144
See application file for complete search history.

(56) References Cited

U.S. PATENT DOCUMENTS

| | | | |
|---|---|---|---|
| 1,517,276 A | 12/1924 | Brooke et al. | 361/144 |
| 3,629,663 A | 12/1971 | Butkus | 361/144 |
| 3,783,344 A | 1/1974 | Ono et al. | 361/144 |
| 4,032,828 A * | 6/1977 | Strobl et al. | 320/123 |
| 4,167,030 A * | 9/1979 | Heidt | 361/154 |
| 4,208,656 A | 6/1980 | Littwin | 340/635 |
| 4,210,994 A | 7/1980 | Schwartz | 29/606 |
| 4,350,379 A | 9/1982 | Peroutky | 294/65.5 |
| 4,414,522 A | 11/1983 | Rybak | 335/291 |
| 4,600,964 A | 7/1986 | Ela et al. | 361/144 |
| 4,633,147 A | 12/1986 | Posma et al. | |
| 4,639,647 A | 1/1987 | Posma | |
| 4,965,695 A | 10/1990 | Baumann | 361/142 |
| 5,166,654 A | 11/1992 | Doyelle | 335/288 |
| 5,325,260 A | 6/1994 | Repetto | 361/144 |
| 5,332,987 A | 7/1994 | Hennessy et al. | 335/216 |
| 5,347,169 A | 9/1994 | Preslar et al. | |
| 5,382,935 A | 1/1995 | Doyelle | 335/288 |

(Continued)

FOREIGN PATENT DOCUMENTS

DE    32 28 178 A1    2/1984

(Continued)

OTHER PUBLICATIONS

Japanese Patent Abstract for JP05343222.*

(Continued)

*Primary Examiner*—Stephen W Jackson
*Assistant Examiner*—Christopher J Clark
(74) *Attorney, Agent, or Firm*—Richard C. Litman (57) ABSTRACT

A solid-state magnet control includes a housing and magnet control circuitry mounted within the housing. The magnet control circuitry includes an insulated gate bipolar transistor (IGBT) bridge configuration and DUMP circuitry. The DUMP circuitry inhibits circuit damage to the magnet control circuitry and other components contained within the magnet control caused by overvoltage and/or voltage transients. The magnet control circuitry controls current passing through the magnet. The IGBT bridge configuration includes a LIFT HIGH IGBT, a LIFT LOW IGBT, a CLEAN HIGH IGBT, and a CLEAN LOW IGBT, as well as a capacitor bank. The DUMP circuitry includes a DUMP HIGH IGBT, a discharge diode, and a discharge resistor. The magnet control is configured to provide power loss ride through, ground fault detection, and discharge voltage control, and can accept increased voltage supply to reduce charge-up time of the magnet, and existing operator control inputs through a relay interface.

14 Claims, 7 Drawing Sheets

U.S. PATENT DOCUMENTS

| | | | |
|---|---|---|---|
| 5,748,062 A | 5/1998 | Kirkpatrick | 335/294 |
| 5,813,712 A | 9/1998 | Mozelt | 294/65.5 |
| 5,998,944 A * | 12/1999 | Clutter et al. | 318/141 |
| 6,076,873 A | 6/2000 | Jung | 294/65.5 |
| 6,157,148 A | 12/2000 | Posma | |
| 6,170,923 B1 * | 1/2001 | Iguchi et al. | 303/122.04 |
| 6,710,574 B2 | 3/2004 | Davis et al. | |
| 6,767,177 B2 | 7/2004 | Opitz | 414/737 |
| 6,784,721 B2 * | 8/2004 | Torrisi et al. | 327/434 |
| 6,992,520 B1 | 1/2006 | Herbert | |
| 7,245,471 B2 * | 7/2007 | Pollock et al. | 361/91.5 |
| 2003/0194305 A1 | 10/2003 | Opitz | 414/737 |
| 2004/0236183 A1 * | 11/2004 | Durrell | 600/173 |

FOREIGN PATENT DOCUMENTS

| | | |
|---|---|---|
| DE | 32 39 153 A1 | 4/1984 |
| JP | 54-157961 | 12/1972 |
| JP | 05343222 * | 12/1993 |

OTHER PUBLICATIONS

English translation of JP-05-343222, Dec. 1993, Onari.

* cited by examiner

SOLID-STATE MAGNET CONTROL

BACKGROUND OF THE INVENTION

1. Field of the Invention

The present invention generally relates to magnet controls and, more particularly, to a solid-state magnet control.

2. Description of Related Art

Electromagnets for use in lifting, crane, and/or any other similar operations are well known and are used for the positioning and handling of ferromagnetic materials including steel products or the like in a variety of arrangements including processing machines, pick-and-place units, automation projects, etc. Such electromagnets can be used in the lifting of flat, round, and/or other shapes of ferromagnetic materials. Operating modes for use with lifting magnets typically include LIFT, DROP, and/or DRIBBLE operating modes.

Magnet controllers using existing technology typically require the input power supply voltage to be above a minimum level in order to maintain holding of the load and to provide control power voltage to their contactor coils. Upon loss of input power, or a reduction below that required to hold in the contact coils of such magnet controllers, then the circuit of such magnet controllers is configured, by their default de-energized condition, into the DROP configuration. The magnet energy is immediately discharged through a discharge load and the load is dropped.

Conventional magnet controllers discharge the energy stored within the magnet by switching a discharge load across the magnet. Common discharge loads utilized are resistors or varistors. The problem with conventional magnet controllers is that the rapid change in magnet current (di/dt), caused when the load is switched across the magnet, induces a very high magnitude voltage spike into the supply. These discharge voltage spikes can range from around 800 VDC to greater than around 1,500 VDC depending on the discharge load utilized and these voltage spikes can cause damage and deterioration of equipment.

Using traditional voltage control contactor based magnet controllers, magnets heat up during use due to internal electrical power losses proportional to the resistance of the magnet coil. The rise in magnet temperature causes an increased resistance of the copper or aluminum magnet windings and, subsequently, causes proportionally greater internal power losses. The increased resistance reduces the current acceptance of the magnet coil as well as the magnitude of the current through the magnet as defined by V=IR when utilizing, a constant voltage supply. The reduced current acceptance reduces the capacity of the magnet, the magnet is able to pick up less material, and the reduced efficiency results in reduced production throughput.

Magnet charge up time is the time it takes for the magnet current to build up to the steady state lifting current level. Magnet charge up time, for a given magnet, is dependent upon the voltage applied. The higher the supply voltage, the less time it takes to build up lifting current within the magnet. Traditional technology uses a constant voltage supply, typically 230 VDC, to supply power to the magnet. Because traditional technology does not control magnet current, use of a higher voltage supply would induce magnet currents greater than the magnet can withstand.

Therefore, a need exists for a solid-state magnet control to reduce maintenance requirements, improve production efficiency, and provide current control, as well as inhibit circuit damage to magnet control circuitry and other component contained within a magnet control caused by overvoltage and/or voltage transients.

SUMMARY OF THE INVENTION

The present invention is a solid-state magnet control. The magnet control includes a housing and magnet control circuitry mounted within the housing. The magnet control circuitry includes an insulated gate bipolar transistor (IGBT) bridge configuration, and DUMP circuitry interconnected with the magnet control circuitry. The DUMP circuitry inhibits circuit damage to the magnet control circuitry and other components contained within the magnet control caused by overvoltage and/or voltage transients. The magnet control circuitry controls current passing through the magnet. The IGBT bridge configuration includes a LIFT HIGH IGBT, a LIFT LOW IGBT, a CLEAN HIGH IGBT, and a CLEAN LOW IGBT. The magnet control circuitry also includes a capacitor bank. The DUMP circuitry includes a DUMP HIGH IGBT, a discharge diode, and a discharge resistor.

The magnet control is configured to provide power loss ride through, ground fault detection, and discharge voltage control. The magnet control is also configured to accept increased voltage supply to reduce charge-up time of the magnet, and to accept existing operator control inputs through a relay interface.

The magnet control utilizes categories of LIFT, CLEAN, and voltage parameters. The LIFT parameters include FULL LIFT current, FULL LIFT pulse width modulation (PWM), FULL LIFT timeout, HOLDING current, HOLDING PWM, DRIBBLE current, PEAK current. The CLEAN parameters include CLEAN current, CLEAN PWM, CLEAN timeout, DRIBBLE current, DRIBBLE PWM, and DRIBBLE timeout. CLEAN current is the current maintained to clean the magnet. The VOLTAGE parameters include SHUTDOWN voltage, DUMP voltage, MINIMUM CAPACITOR voltage, CHARGE-UP DELTA voltage, and DUMP TEST data.

The magnet control can be used in combination with a data terminal configured to determine status of a variety of parameters of the magnet control. The magnet control is configured to detect cut cables, to detect shorted cables, to control multiple magnets on a beam, and can include a battery backup to enable load to be maintained by a magnet upon loss of input voltage. The magnet control reduces maintenance requirements, improves production efficiency, and provides current control, as well as inhibits circuit damage to magnet control circuitry and other components contained within the magnet control caused by overvoltage and/or voltage transients.

DETAILED DESCRIPTION OF THE PREFERRED EMBODIMENTS

The present invention is a solid-state magnet control. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 1:
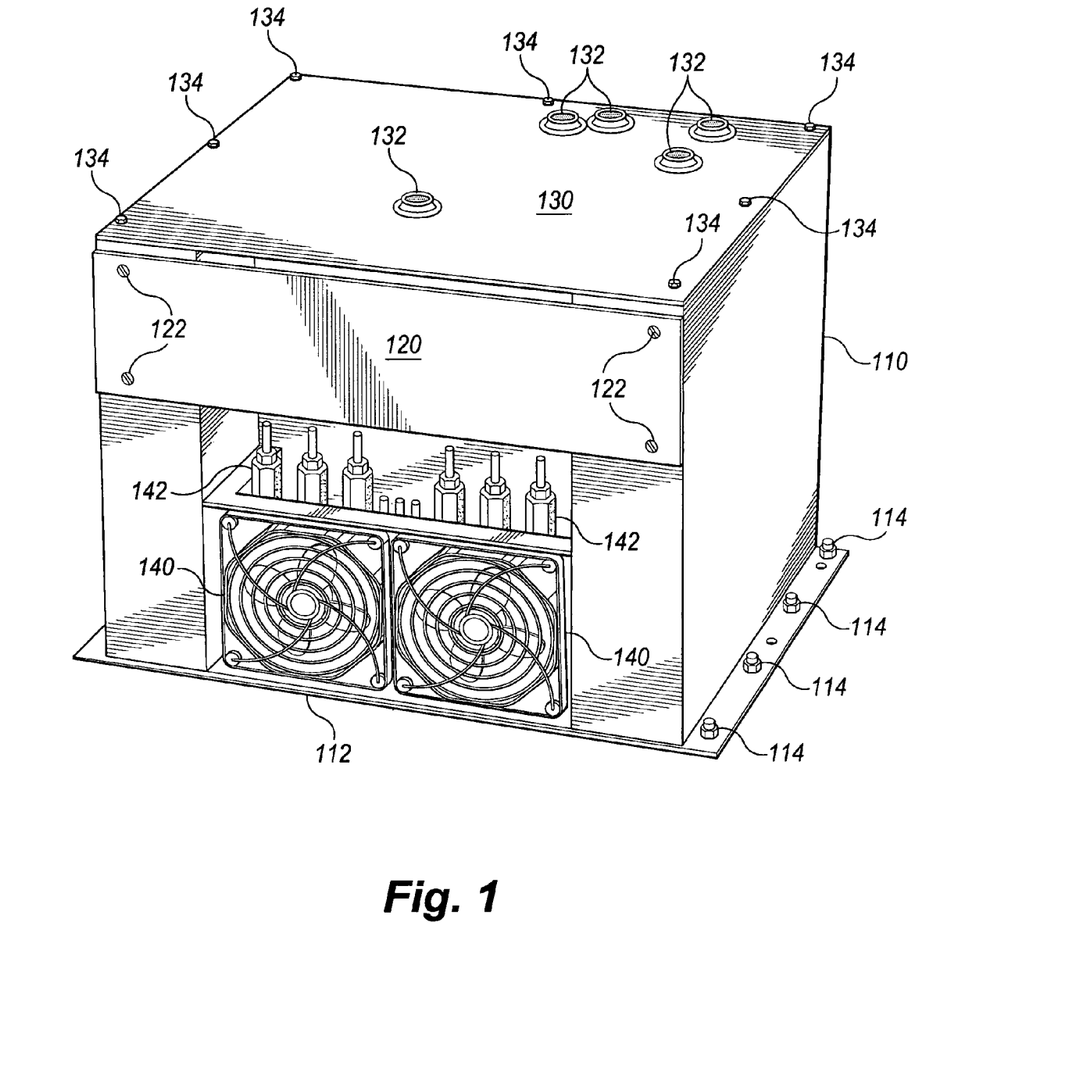
FIG. 1 is a front perspective view of a solid-state magnet control according to the present invention.

Referring to the drawings, FIG. 1 shows a solid-state magnet control 100 according to the invention. The magnet control 100 has a housing 110 with a base 112. The base can be fastened to a support by fasteners 114. The housing 110 includes a front panel 120 removably mounted by fasteners 122 and a tot panel removably mounted by fasteners 134. Fans 140 are mounted behind fan guards in the housing 110. Terminals 142 and additional elements are also mounted in the housing 110. Terminals 142 are for interconnecting the magnet control 100 to a magnet. The magnet control 100 includes a DC power supply or can be configured to receive DC input power from an external power source.

Figure 2:
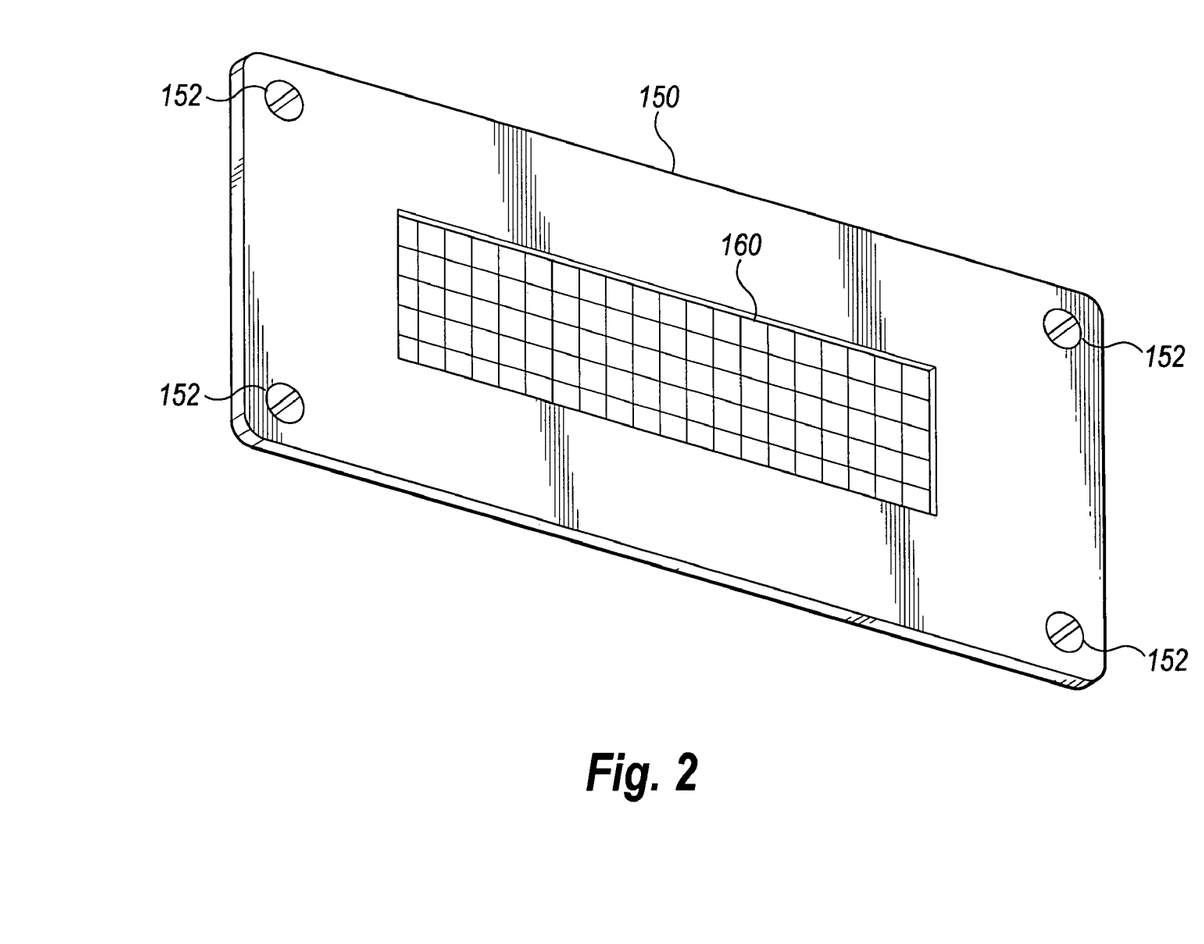
FIG. 2 is top view of a display for the solid-state magnet control according to the present invention.

As shown in FIG. 2, a display 150 can be mounted to the housing 110 to provide useful information to users regarding the operation of the magnet control 100 via a display screen 160. Such information can be presented in the form of alphanumeric characters, icons, images, etc. The display screen 160 can be configured as a liquid crystal display (LCD), a light emitting diode (LED) display, or the like. The display 150 can be mounted to the housing 110 by fasteners 152.

Figure 3:
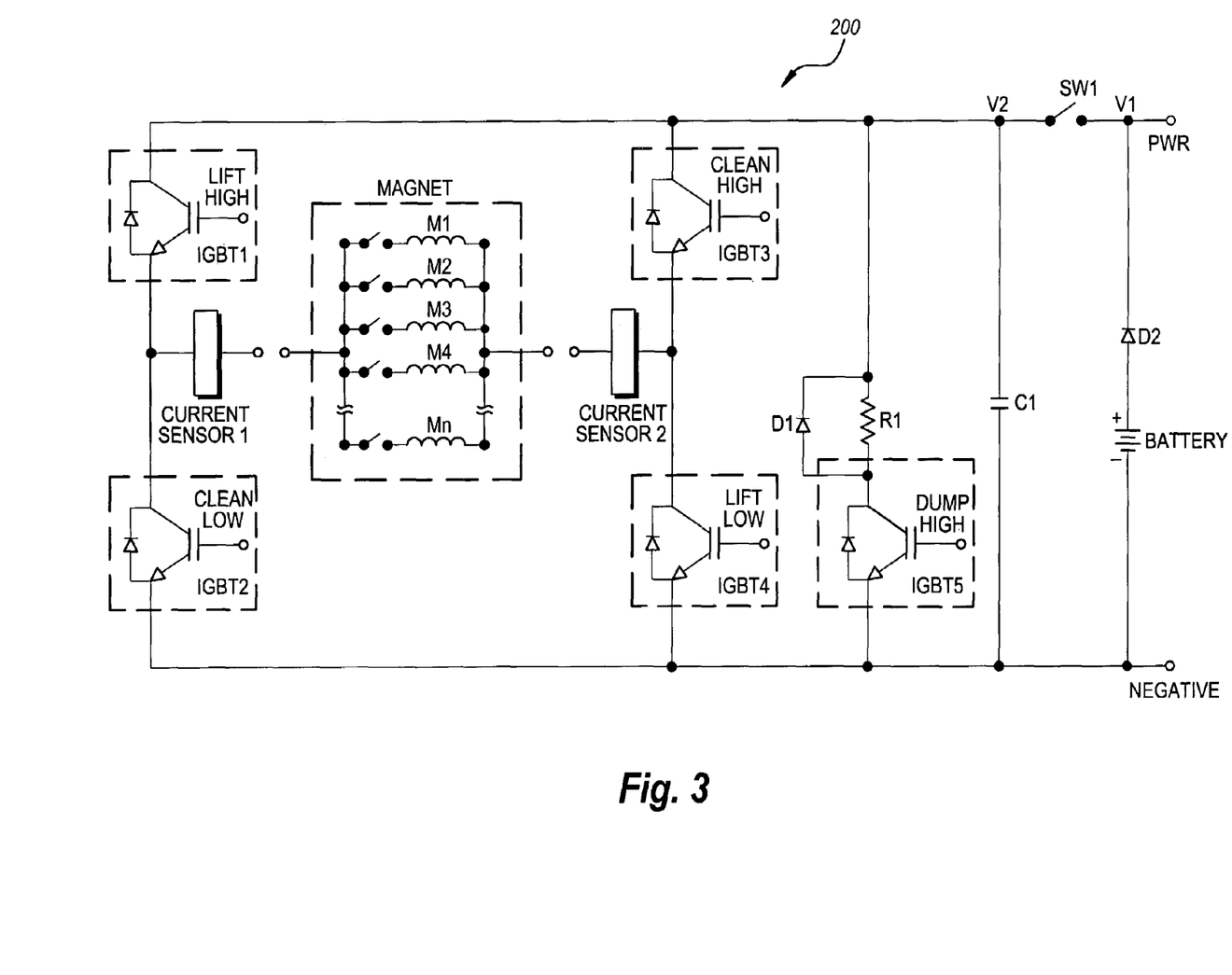
FIG. 3 is a schematic diagram of solid-state magnet control circuitry according to the present invention.
Figure 4:
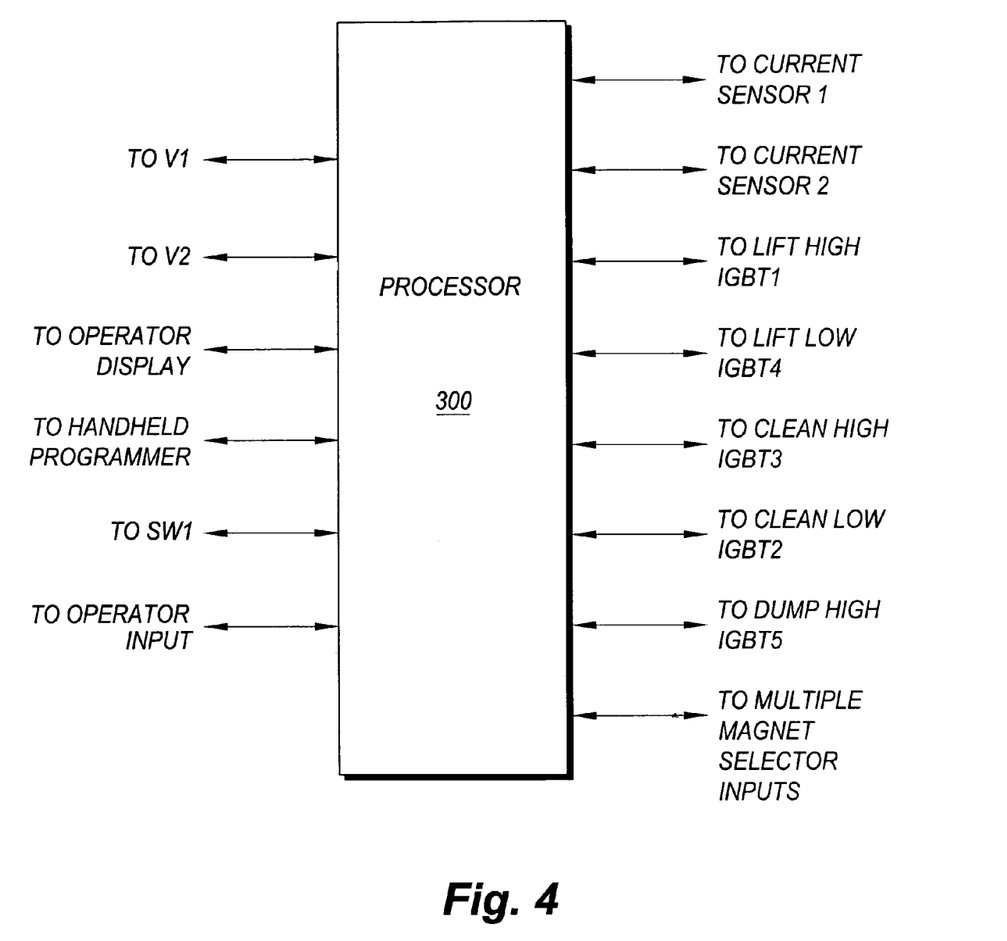
FIG. 4 is a block diagram of a processor for interconnecting with the solid-state magnet control circuitry shown in FIG. 3.

Referring to FIGS. 3 and 4, magnet control circuitry 200 is mounted in the housing 110. The magnet control circuitry 20 is interconnected with a processor 300 which can be any type of processor, such as a microprocessor, a micro controller, an application specific integrated chip (ASIC), or the like. The magnet control circuitry 200 is configured to be attached to one or more magnets M1, M2, M3, M4, . . . , Mn connected in parallel. Such magnets can be interconnected to the magnet control circuitry 200 through the use of relay inputs or the like.

The magnet control circuitry 200 includes a current sensor 1, current sensor 2, LIFT HIGH IGBT1, CLEAN LOW IGBT2, CLEAN HIGH IGBT3, a LIFT LOW IGBT4, capacitor bank C1, and power contactor switch SW1. The capacitor bank C1, while illustrated as a single capacitor, can be any number of capacitors as desired. Interconnected with the magnet control circuitry 200 is DUMP circuitry including a DUMP HIGH IGBT5, discharge diode D1, discharge resistor R1.

IGBTs are a cross between bipolar and metal oxide field effect transistors (MOSFETs). IGBTs have output switching and conduction characteristics of bipolar transistors but are voltage controlled like MOSFETs. IGBTs generally have the advantages of high current handling capabilities of bipolar transistors with the ease of control of MOSFETs. Typical IGBT applications include motor controls, uninterruptible power supplies, welding, and low power lighting.

Successful use of IGBT applications to magnets has not been achieved because IGBTs are easily damaged by overvoltage and/or voltage transients caused, for example, by short circuits, cable breaks, etc. The DUMP circuitry including the DUMP HIGH IGBT5 contains the voltages occurring in IGBT1, IGBT2, IGBT3, and IGBT4 to a level less than the voltage rating of each corresponding IGBT, thereby inhibiting circuit damage to the magnet control circuitry 200, the capacitor bank C1, and other components contained within the magnet control 100 caused by overvoltage and/or voltage transients. The use of the DUMP HIGH IGBT5 in combination with the other components of the magnet control circuitry 200 protects the IGBTs in the magnet control circuitry 200 due in large part to the speed in which the DUMP HIGH IGBT5 compensates for overvoltages and/or voltage transients.

A battery bank can be provided to provide backup power and allow for a load to be maintained upon loss of line voltage V1. The battery bank can be one or more batteries in series and/or parallel combination in order to create a predetermined voltage and ampere capacity for a desired application. An isolation diode D2 prevents the battery bank from charging over the line voltage V1.

Under normal operating conditions, the input or line voltage V1 is equal to the voltage V2 of the capacitor bank C1, and is above the voltage of the battery bank, the isolation diode D2 is reversed biased, and the battery bank is in a static condition. When the input voltage V1 is lost and V1 falls below the voltage of the battery bank, the isolation diode D2 is forward biased, current flows from the battery bank to the magnet control circuitry 200, the magnet remains energized, and the magnet is able to hold and maintain its load. When the input voltage V1 returns, the isolation diode is again reverse biased, the power for the magnet control circuitry 200 is again supplied from its normal source, and the magnet control circuitry 200 returns to normal operation. The battery bank is maintained normally charged by using a charging source connected across the battery bank.

Additional elements 132 can be included on the top panel. Control parameters for the magnet control 100 include LIFT current, LIFT pulse width modulation (PWM), FULL LIFT time-out (time at full on before reduced holding current), HOLDING CURRENT level/PWM, DRIBBLE current, DRIBBLE shut-off level (PWM at which the magnet is shut off after dribble), DRIBBLE time, CLEANING current, CLEANING PWM, CLEANING time, safety voltages (over voltage shutdown, dump voltage (maximum magnet discharge voltage), minimum supply voltage), and current limit. Troubleshooting and diagnostics of the magnet control 100 can be done using a handheld programmer (HHP).

Figure 5:
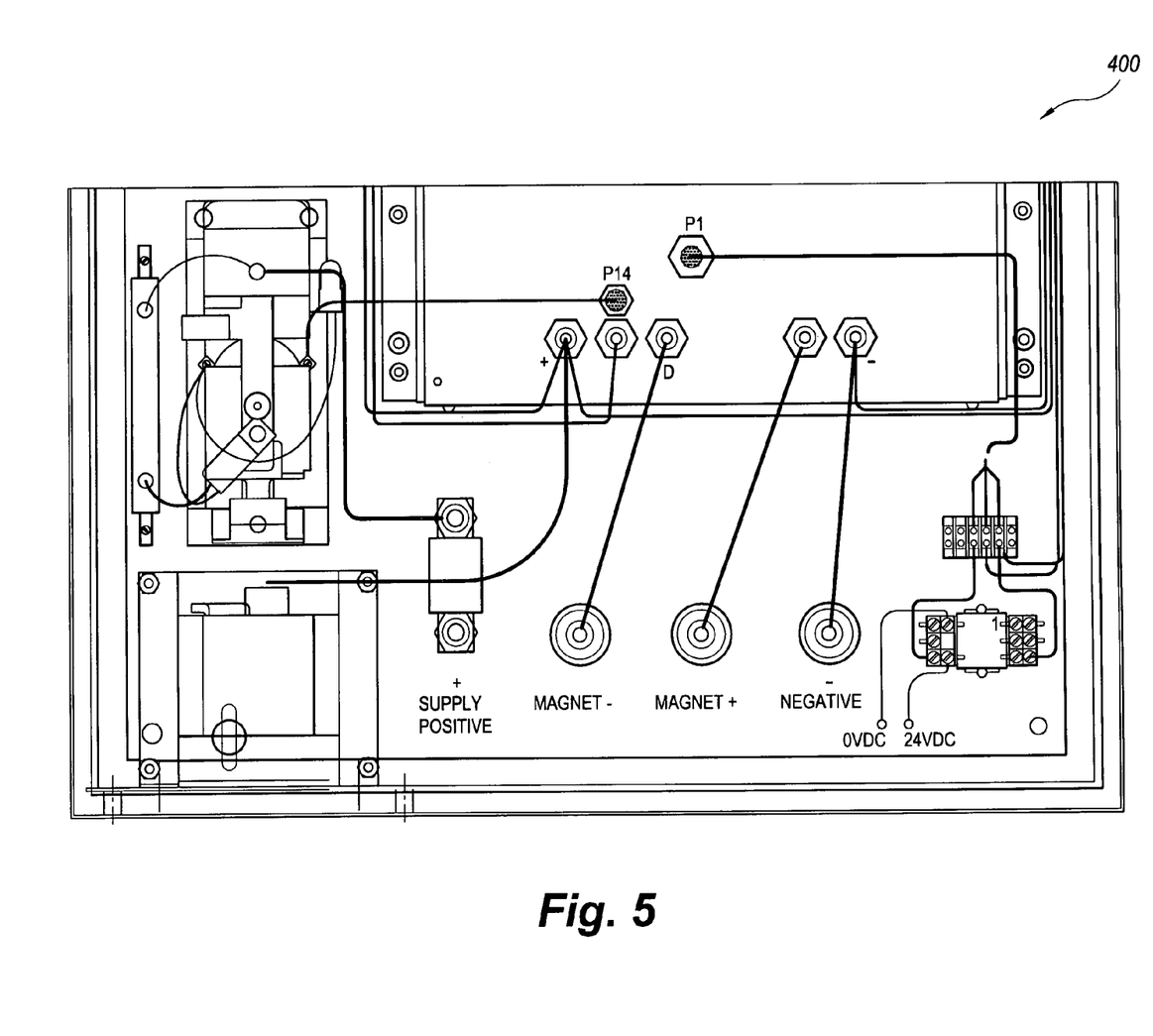
FIG. 5 is a wiring diagram of the solid-state magnet control shown in FIG. 1.
Figure 6:
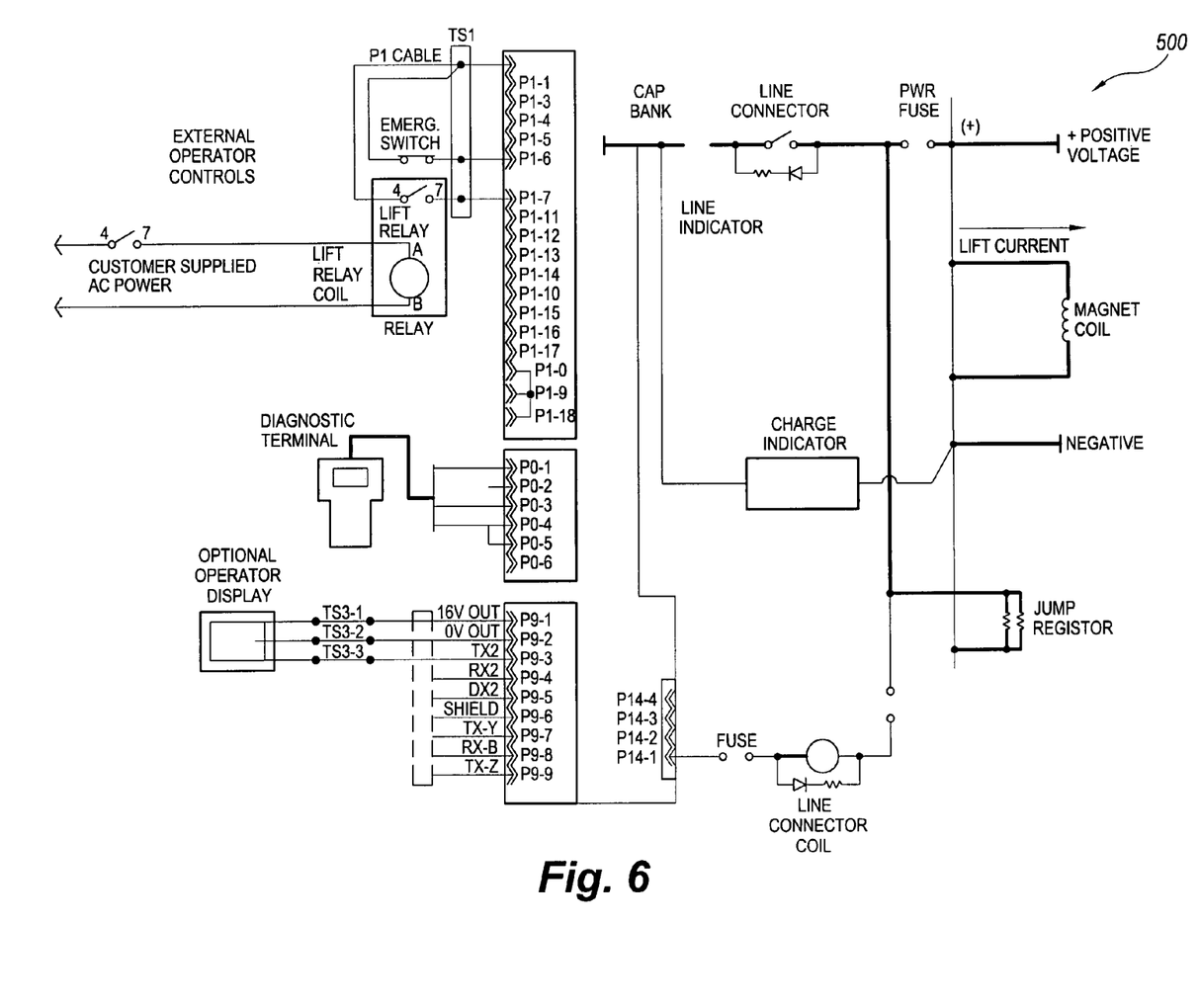
FIG. 6 is an installation schematic diagram of the solid-state magnet control shown in FIG. 1.

The processor 300 can receive input data and can provide output data to V1, V2, the operator display 150, an HHP, the SW1, operator inputs, the current sensor 1, the current sensor 2, the LIFT HIGH IGBT1, the LIFT LOW IGBT4, the CLEAN HIGH IGBT3, the CLEAN LOW IGBT2, the DUMP HIGH IGBT5, and/or any of multiple magnet selector inputs. A wiring diagram 400 of the magnet control 100 is shown in FIG. 5, and an installation schematic diagram 500 of the magnet control 100 is shown in FIG. 6.

The magnet control 100 is configured to utilize LIFT and DROP input commands. DRIBBLE and CLEAN features can be provided and can be automatically controlled within the DROP operation. The DRIBBLE feature can be configured as an additional input command, in which case the magnet control 100 dribbles the load and then cleans automatically. During a LIFT input command, lifting current is applied to the magnet and, after a predetermined amount of time at a full lifting current, the lifting current is automatically reduced to a holding current level. During a DROP input command, the magnet is rapidly discharged and then cleaned automatically. During a DRIBBLE input command, the magnet is slowly discharged to allow the load to be spread as it comes off the magnet. The magnet current is then reversed and the magnet is cleaned automatically.

When LIFT is commanded, the bridge configuration of the LIFT HIGH IGBT1, CLEAN LOW IGBT2, CLEAN HIGH IGBT3, and LIFT LOW IGBT4 (hereinafter the IGBT bridge configuration), is set to lift and quickly ramps up the PWM. If dribble is allowed and drop is commanded, the IGBT bridge configuration is maintained and the PWM is slowly ramped down until a predetermined set level is reached (e.g., a predetermined set time and a predetermined set PWM level). Once DRIBBLE has timed out, the IGBT bridge configuration is changed to clean the magnet and the PWM is quickly ramped up to set clean the magnet current level.

When LIFT is commanded, the control sets the LIFT HIGH IGBT1 ON and LIFT LOW IGBT4 is ramped up quickly to 100% PWM. After a predetermined amount of time at a predetermined set maximum lift current, the control reduces the magnet current to a predetermined set holding current level by reducing the PWM of the LIFT LOW IGBT4. Current then flows in the lift direction through the LIFT HIGH IGBT1, through the magnet, and through the LIFT LOW IGBT4.

When DROP is commanded, both the LIFT LOW IGBT4 and the LIFT HIGH IGBT1 are turned off. The magnet current then flows from the magnet, through the CLEAN HIGH IGBT3, into the supply and capacitor bank C1 and returns to the magnet through the CLEAN LOW IGBT2. This raises the voltage of the capacitor bank C1 to level higher than the supply voltage. When a predetermined set capacitor bank C1 voltage level is reached, the interconnected processor turns on the DUMP HIGH IGBT5 and the voltage of the capacitor bank C1 is controlled at that set voltage level. This reduces the energy in the magnet as quickly as possible while maintaining a controlled capacitor bank C1 voltage.

When the measured current in the magnet reduces to a predetermined set level, the control transitions to CLEAN. The CLEAN HIGH IGBT3 is turned on and the CLEAN LOW IGBT2 is ramped up the set CLEAN PWM. During this transition, current continues to) flywheel through the CLEAN LOW IGBT2 and the CLEAN HIGH IGBT3. The current continues to flow through the flywheel path until the magnet energy is dissipated, at which time both the CLEAN LOW IGBT2 and the CLEAN HIGH IGBT3 become reverse biased and the pulsed CLEAN LOW IGBT2 begins to pull current through the CLEAN HIGH IGBT3 in the opposite direction through the magnet. This reversed, cleaning current ejects any remaining material from the magnet. When the DRIBBLE is commanded from the LIFT configuration, the control slowly ramps down the LIFT LOW IGBT4 PWM until the IGBT4 is off. This gradually reduces the magnet current and allows a gradual release of the magnet load.

When in LIFT, if the supply power is lost and V1 and V2 are determined to have dropped below a predetermined set voltage, the input voltage is monitored, the capacitor bank C1 voltage is monitored, the LIFT HIGH IGBT1 is ON, the line contactor SW1 is OPENED, the LIFT LOW IGBT4 is turned OFF, the CLEAN HIGH IGBT3 is off, and the CLEAN LOW IGBT2 is OFF. Magnet current flows through the magnet, through the body diode of the CLEAN HIGH IGBT3, through the LIFT HIGH IGBT1, and back through the magnet.

The magnet current through the magnet is monitored b CURRENT SENSOR 1 and CURRENT SENSOR 2. If V2 drops below a predetermined set level, then the LIFT HIGH IGBT1 is momentarily pulsed off. This redirects the magnet current through the capacitor bank C1, and re-charges the capacitor bank C1 which continues to supply control power to the magnet control 100 and the IGBT bridge configuration.

When V2 rises to an acceptable level, the LIFT HIGH IGBT1 is again turned on allowing the magnet current to circulate around a low impedance path. This operation continues until either the residual magnet energy is depleted, the load drops and the magnet control 100 shuts down, or until the supply voltage V1 returns to an acceptable level. If V1 returns to an acceptable level, then the magnet control 100 is returned to its normal lift configuration by closing the line contactor SW1, turning on, or pulsing the LIFT LOW IGBT4 as necessary.

The magnet control 100 can control the magnet current using the IGBT bridge configuration to reduce magnet heating, increase efficiency, and eliminate voltage spikes. When the ambient temperature is around fifty degrees Celsius, the input voltage preferably ranges from around a generally nominal voltage of 230 VDC and between a minimum voltage of around 120 VDC and a maximum voltage of around 400 VDC. This voltage range results in a magnet current having a maximum range between around 200 and 350 amps. However, magnet controllers using the same configuration can be made to handle higher currents and voltages.

When operating under the preferable conditions, the LIFT operating mode applies around 100% supply voltage within 50 milliseconds of receiving the LIFT command. The HOLD operating mode reduces the lift current to a holding current level following load pick-up. The DRIBBLE operating mode reduces supply voltage to the magnet, and the magnet filed collapses slowly through self-discharge. The DROP operating mode removes supply voltage from the magnet, and the magnet field is discharged quickly using the DUMP circuitry with the DUMP HIGH IGBT5. The CLEAN operating mode reverses the supply voltage, and the magnet field reverses and completes the drop and cleaning of the magnet.

The magnet control is configured to replace existing electromechanical contactor based technology. The IGBT bridge configuration enables the magnet control 100 to control the current passing through the magnet. Existing technology utilizes voltage control such that the magnet current is dependent upon the magnets internal resistance and temperature. It is the magnet current which determines the magnetic lifting force and control of the magnet current allows control of the magnet lifting force. The magnet control 100 controls the magnet current whereas contactor based technology applies a constant voltage and the magnet current is then dependent on the impedance of the magnet which increases as the magnet heat up. The magnet control 100 is also capable of controlling the voltage of the magnet.

The magnet control circuitry 200 controls the voltage induced into the supply when the magnet is discharged. The magnet control circuitry 200 eliminates voltage spikes into the supply and controls the discharge voltage to a predetermined level, typically below around 320 VDC. Traditional contactor controls utilize discharge loads which allow voltage spikes of between about 700 VDC and 1,600 VDC into the supply. These voltage spikes into the line can be detrimental to the supply as well as any other equipment connected to the supply. The magnet control reduces maintenance requirements, improves production efficiency, and provides current control, as well as inhibits circuit damage to magnet control circuitry and other components contained within the magnet control 100 caused by overvoltage and/or voltage transients.

The magnet control 100 provides power loss ride through, ground fault detection, discharge voltage control, magnet temperature determination, and enables the use of a higher voltage supply to reduce magnet charge-up time. The magnet control 100 also enables the use of existing operator control inputs through a relay interface.

Power loss ride through occurs when input power to the magnet control 100 is lost while in LIFT mode, as determined by a reduction in V1 and V2 below a set level, the magnet control circuitry 200 can be automatically re-configured and controlled to hold the load for a period of time utilizing the energy stored within the magnet to provide both control power to the magnet control 100 and holding power for the load. This power loss ride through or low voltage ride through is accomplished by reconfiguring the IGBT bridge configuration to allow the magnet to circulate around a low impedance current path while periodically redirecting the magnet current to charge up the capacitor bank C1 which supplies control power for the magnet control 100 and the IGBT bridge configuration.

During the LIFT operation, if the supply power is lost and V1 and V2 are determined to have dropped below a predetermined set voltage, the input voltage V1 is monitored, the capacitor bank C1 voltage V2 is monitored, the LIFT HIGH IGBT1 is ON, the LIFT LOW IGBT4 is ON or PULSED, the CLEAN HIGH IGBT3 is OFF, and the CLEAN LOW IGBT2 is OFF. Current flow is from the supply positive, through the LIFT HIGH IGBT1, through the magnet, and through the LIFT LOW IGBT4 to the supply negative.

When DROP is commanded, both the LIFT LOW IGBT4 and the LIFT HIGH IGBT1 are turned off. The magnet current then flows from the magnet, through the CLEAN HIGH IGBT3, into the supply and capacitor bank C1 and returns to the magnet through the CLEAN LOW IGBT2. This raises the voltage of the capacitor bank C1 to a level higher than the supply voltage. When a predetermined set capacitor bank C1 voltage level is reached, the interconnected processor turns on the DUMP HIGH IGBT5 and the voltage of the capacitor bank C1 is controlled at that set voltage level. This reduces the energy in the magnet as quickly as possible while maintaining a controlled capacitor bank C1 voltage.

When the measured current in the magnet reduces to a predetermined set level, the control transitions to CLEAN. The CLEAN HIGH IGBT3 is turned on and the CLEAN LOW IGBT2 is ramped up the set CLEAN PWM. During this transition, current continues to flywheel through the CLEAN LOW IGBT2 and the CLEAN HIGH IGBT3. The current continues to flow through the flywheel path until the magnet energy is dissipated, at which time both the CLEAN LOW IGBT2 and the CLEAN HIGH IGBT3 become reverse biased and the pulsed CLEAN LOW IGBT2 begins to pull current through the CLEAN HIGH IGBT3 in the opposite direction through the magnet. This reversed, cleaning current ejects any remaining material from the magnet. When the DRIBBLE is commanded from the LIFT configuration, the control slowly ramps down the LIFT LOW IGBT4 PWM until the IGBT4 is off. This gradually reduces the magnet current and allows a gradual release of the magnet load.

When in LIFT, if the supply power is lost and V1 and V2 are determined to have dropped below a predetermined set voltage, the input voltage is monitored, the capacitor bank C1 voltage is monitored, the LIFT HIGH IGBT1 is ON, the line contactor SW1 is OPENED, the LIFT LOW IGBT4 is turned OFF, the CLEAN HIGH IGBT3 is off, and the CLEAN LOW IGBT2 is OFF. Magnet current flows through the magnet, through the body diode of the CLEAN HIGH IGBT3, through the LIFT HIGH IGBT1, and back through the magnet.

Ground fault detection occurs if there is a ground fault in the cabling from the magnet control 100 to the magnet, within the magnet, or in cabling from the magnet to the magnet control 100. The magnet control 100 can identify the ground fault condition by measuring and monitoring current to and from the magnet as it exits and re-enters the magnet control 100 using current sensors 1 and 2. Under normal, no fault conditions, the currents measured and monitored through the current sensors 1 and 2 are equal. If the currents measured and monitored through the current sensors 1 and 2 are determined to be unbalanced (not equal) by a predetermined amount, then there is current leakage in the magnet circuit and the magnet control determines a ground fault exist. Ground faults can also be detected if a target or otherwise predetermined magnet current is attained at a lower than normal LIFT LOW IGBT4 PWM.

The magnet control 100 provides discharge voltage control to limit the voltage rise into the supply to a set, user programmable voltage. The magnet control circuitry utilizes the capacitor bank C1 as well as the DUMP HIGH IGBT5 connected in series with the discharge resistor R1. The magnet control circuitry 200 limits the voltage rise to a user programmable level, typically below about 320 VDC.

During a LIFT operation, the LIFT HIGH IGBT1 is ON, the LIFT LOW IGBT4 is ON or PULSED, the CLEAN HIGH IGBT3 is OFF, and the CLEAN LOW IGBT2 is OFF. V1 and V2 are monitored and current flow is from the supply positive, through the LIFT HIGH IGBT1, through the magnet, and through the LIFT LOW IGBT4 to the supply negative. When DROP is commanded, the LIFT LOW IGBT4 is turned OFF, the LIFT HIGH IGBT1 is turned OFF, and the capacitor bank C1 voltage is monitored. Current from the magnet then flows through the body diode of the CLEAN HIGH IGBT3, through the capacitor bank C1 to the supply negative, which causes V2 to rise above the normal supply voltage.

When V2 rises to a set level, the DUMP HIGH IGBT5 is turned ON, current passes through R1, and V2 is quickly reduced. When V2 is reduced below a set level, then the DUMP HIGH IGBT5 is turned OFF, current again passes through the capacitor bank C1, thereby causing V2 to rise again. When V2 again rises to a set level, the DUMP HIGH IGBT5 is turned ON and the cycling, pulsing of the DUMP HIGH IGBT5 rapidly discharges the magnet and drops the load while limiting the voltage rise to the supply (V1, V2) to a set, user programmable level.

The magnet control 100 provides magnet temperature and magnet temperature determination. The magnet control 100 utilizes current control rather than voltage control since it is the current passing through the magnet coils that determines the magnetic force available. Utilizing current control, a lifting current is induced in the magnet allowing the magnet to pick up a full load, then after a set period of time, the current is reduced to a holding current since it takes less energy to hold the load than to pick it up. This control of the magnet current allows for efficient operation of the magnet, reduces internal power losses proportional to $I^2R$, and maintains a greater magnet efficiency and greater production throughput.

The magnet control 100 determines magnet core temperature using an algorithm with inputs including steady state measured magnet voltage, steady state measured magnet current, and resistive temperature coefficient of the magnet windings which are usually cooper or aluminum. The magnet core temperature algorithm calculates the resistance of the magnet using R=V/I and then determines the core magnet temperature by utilizing the magnets temperature coefficient of resistivity. The calculated magnet core temperature can then be utilized to further optimize the efficiency of the magnet control 100 and to provide indication of the magnet temperature to operators of the magnet control 100.

The magnet control 100 enables the use of higher voltage supply to reduce magnet charge-up time. Traditional technology uses a constant voltage supply, typically around 230 VDC, to supply power to the magnet. Because traditional technology does not control magnet current, use of a higher voltage supply would induce magnet currents greater than the magnet can withstand. The magnet control 100 enables the use of a higher voltage supply that reduces magnet charge-up time, reduces the magnet lift cycle time, and increases production throughput. For example, use of a 270 VDC constant voltage supply, in place of a standard 230 VDC voltage supply, would reduce the magnet charge-up time and increase production throughput. This is made possible by turning ON the LIFT HIGH IGBT1, quickly ramping up the LIFT LOW IGBT4 PWM to 100%, monitoring the magnet current, and then controlling the magnet lift current by reducing the LIFT LOW IGBT4 PWM when the set lifting current is reached.

The magnet control 100 enables the use of existing operator control inputs through a relay interface. Existing applications where the magnet control 100 would replace a traditional control can have existing operator controls which supply input commands, LIFT/DRIBBLE/DROP, to the magnet control installed. These existing operator controls supply control power signals to the existing controllers. These control voltages can vary by location and are typically 24 VDC, 48 VDC, 120 VAC, or some similar voltage. In order to utilize the existing controls a relay interface is used between the operator control and the magnet control 100. This relay interface provides dry contact inputs to the magnet control 100 and precludes the need to either change out the existing operator controls or to customize the inputs of the magnet control 100.

The magnet control 100 provides cut cable detection. Cables between the magnet control 100 and the magnet can be cut, creating either an open circuit condition or a short circuit condition, when the magnet handles metal and scrap during normal production. For an open circuit condition, the magnet control monitors the current through the magnet as well as line voltage V1, capacitor bank voltage V2, and the switching PWM of the LIFT LOW IGBT4 or the CLEAN LOW IGBT2. Under normal operating conditions, the magnet current is proportional to the magnet resistance and the applied voltage, which is a function of V2 and the switching PWM of the LIFT LOW IGBT4 or CLEAN LOW IGBT2.

When a cable is cut creating an open circuit condition, the magnet current rapidly decreases to zero and the PWM of the LIFT LOW IGBT4 or CLEAN LOW IGBT2 quickly ramps up in an attempt to increase the applied voltage to compensate. Thus, if a condition is detected where the magnet current is detected to be abnormally low for a given voltage, the magnet control 100 can determine that a cable may have been cut and an open circuit condition is likely. The cut cable detection can then be displayed on the operator display 150, if provided, an alarm relay can be energized to provide additional visual and/or audible indication and the magnet control 100 can take action to protect itself and personnel. In particular, the magnet control 100 can inhibit subsequent operation until it is reset and the fault condition is cleared.

The magnet control 100 can provided shorted cable detection. As previously described, cables between the magnet control 100 and the magnet can become cut, creating either an open circuit or a short circuit condition, when the magnet handles metal and/or scrap during normal production. For a short circuit condition, the magnet control 100 monitors the current through the magnet as well as the line voltage V1, the capacitor ban voltage V2, and the switching PWM of the LIFT LOW IGBT4 or CLEAN LOW IGBT2. Under normal operating conditions, the magnet current is proportional to the magnet resistance and the applied voltage, which is a function of V2 and the switching PWM of the LIFT LOW IGBT4 or the CLEAN LOW IGBT2.

When a cable is cut creating a short circuit condition, the magnet current rapidly increases and the PWM of the LIFT LOW IGBT4 or CLEAN LOW IGBT2 quickly ramps down in an attempt to decrease the applied voltage to compensate. Thus, if a condition is detected where the magnet current is detected to be abnormally high for a given applied voltage, the magnet control 100 can determine that a cable may have been cut and a short circuit is likely. The shorted cable detection can then be displayed on the operator display 150, if provided, an alarm relay can be energized to provide additional visual and/or audible indication, and the magnet control 100 can take action to protect itself and personnel. In particular, the magnet control 100 can inhibit subsequent operation until it is reset and the fault condition is cleared.

The magnet control 100 enables users to control multiple magnets on a beam. In some material handling applications, multiple magnets are used, connected in parallel on a load. These magnets are often combinations of different size magnets, each requiring different operating currents. An operator can often select which magnets are to be ON and which are to be OFF. With traditional magnet controllers, the magnets are usually selected by switching magnet contactors in series with each individual magnet. By selecting different magnet configurations, different loads can be handled effectively. Using traditional voltage control magnet controllers, constant voltage is applied across the magnets regardless of which magnets are selected. The total magnet current is determined by the resistance of each individual magnet and the subsequent sum of the currents through the individual magnets.

With the magnet control 100, the current control benefits can be attained if the processor 300 of the magnet control 100 knows which magnets are connected and the operating current requirements of each magnet. Relay inputs are used such that when a user selects magnets for use, associated relays are switched by auxiliary contacts on the magnet selection contactors, and the output of the relays is used as an input to the processor 300, such that the processor 300 then knows which magnets are selected.

When initially setting up the magnet control 100 for use (e.g., inputting the lift, drop, etc. parameters using an HHP), the current requirements of each of the magnets on the beam can be input. Subsequently, when a combination of magnets is selected by the operator, the magnet control 100 knows which magnets are being used and the current requirement for each individual magnet. The magnet control 100 sums the individual magnet current requirements and is able to control the magnets on the beam using current control.

The following is an explanation of some benefits provided by the battery backup of the magnet control 100. Since the magnet control 100 utilizes current control, rather than voltage control, the battery bank can be sized to provide a predetermined holding current at a lower than full voltage. The ability to use a battery bank of a lower voltage allows for reduced size, weight, and cost. Size and weight are critical elements of equipment installed on a crane and cost is always a factor.

In addition, if a full voltage battery bank is used, one with a voltage only slightly lower than the normal input voltage V1, then the current multiplication benefits of the magnet control 100 allow for extended operation, extended battery life, and extended holding time for the load. This allows for a greater amount of time to re-establish normal line voltage V1 before the load drops. A brief explanation of current multiplication follows.

The total lifting current through the magnet can be as high as seven times the magnitude of the current drawn from the line voltage V1. This is true whether the magnet is being supplied from the normal line or battery bank voltage. The total lifting current through the magnet is the sum of the current applied from the line when the LIFT LOW IGBT4 is ON (current flows from the line through the LIFT HIGH IGBT1, through the magnet and through the LIFT LOW IGBT4), plus the flywheel current which flows through the magnet when the LIFT LOW IGBT4 is OFF (current flows from the magnet, through the body diode of the CLEAN HIGH IGBT3, through the LIFT HIGH IGBT1).

Thus, if the LIFT LOW IGBT4 is full ON (PWM 100%), then the magnet current is equal to the current drawn from the supply. If the available supply voltage is above the voltage required to provide the necessary magnet holding current, then the PWM of the LIFT LOW IGBT4 is less than 100% and the LIFT LOW IGBT4 is being switched on and off as required to regulate required lifting current to the magnet for a particular load. During the PWM switching of the LIFT LOW IGBT4, when the LIFT LOW IGBT4 is ON, the magnet current is drawn from the supply, and when the LIFT LOW IGBT4 is OFF then the magnet current is flywheeling as described above and no current is being drawn from the supply. In this case, the magnitude of the magnet current is up to seven times the magnitude of the current drawn from the supply. This allows for either extended battery life or for utilizing a smaller, lighter, and less expensive battery bank.

Figure 7:
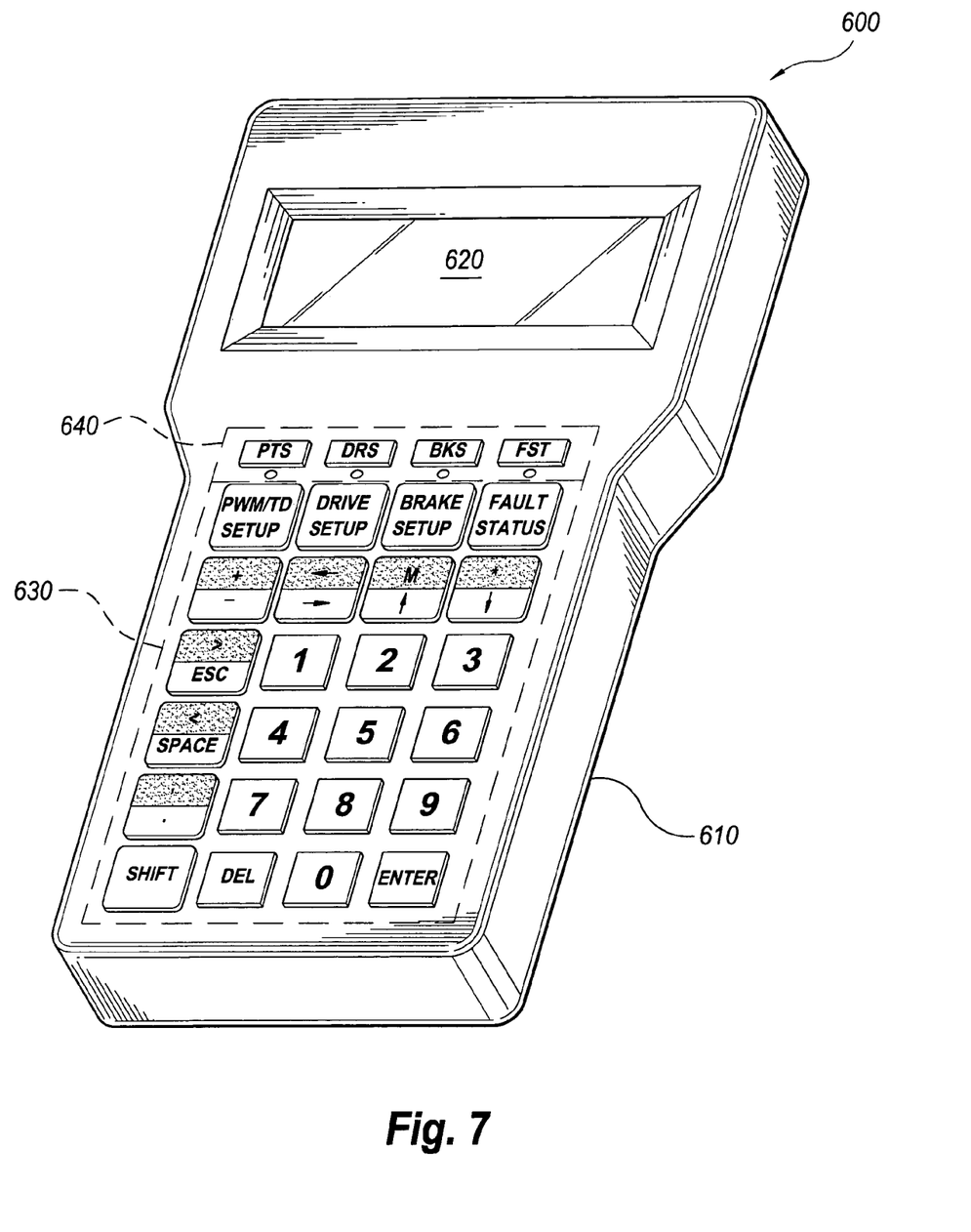
FIG. 7 is a top perspective view of a data terminal for a solid-state magnet control according to the present invention.

Referring to FIG. 7, a data terminal 600 configured to perform tests on the magnet control and determine if the magnet control 100 is operationally configured to run properly. The data terminal 600 includes a housing 610 with a display screen 620, a plurality of interface buttons or keys 630, and mode keys or buttons 640 with corresponding visual indicators (e.g., LEDs or the like). The interface buttons or keys 630 include PWM/TD (pulse width modulation/time delays), DRIVE setup, BRAKE setup, and FAULT status keys or buttons. The mode keys or buttons 640 include corresponding 'PTS', 'DRS', 'BKS', and 'FST' keys or buttons. The housing 610 can also include additional visual indicators and/or audible indicators (e.g., speakers or the like) to visually or audibly alert users regarding particular occurrences as desired. The data terminal 600 includes control logic configured to provide the user with a plurality of menu screens.

If a handheld programmer (HHP) is connected, a predetermined message is displayed. One of the setup/status menus can be selected by pressing certain-keys on the data terminal 600. The display screen 640 is configured to indicate on one or more lines the operator demand as input to the magnet control 100 and the magnet control's response to the operator demand.

Control indicators can change to LIFT when a lift is commanded. The measured magnet current can be indicated followed by the on time percentage of the internal IGBT. The charge on the magnet control capacitor bank C1 can be indicated and can reflect the line voltage. When a load has been dropped the capacitor bank C1 voltage indicates a rise in voltage from the magnet discharge. If the capacitor bank C1 voltage rises above the dump voltage setting then the word dump can appear indicating that the energy is passed to the dump resistor. The display screen remains on as long as the control magnet control 100 is running and is not in a fault condition.

The data terminal 600 can help troubleshoot problems outside of the control magnet 100. A setup/diagnostics mode can be provided to enable a user to determine the status of a variety of parameters. For each settable parameter, the current value, the minimum setting, and the maximum setting can be displayed. A new value can be entered by entering a desired value in the data terminal 600. Parameters of the magnet control 100 can be grouped into three categories of LIFT, CLEAN, and voltage parameters.

LIFT parameters can include FULL LIFT current, FULL LIFT PWM, FULL LIFT timeout, HOLDING current, HOLDING PWM, DRIBBLE current, PEAK current. FULL LIFT current is the current maintained for full load. Values can be entered in amps. FULL LIFT timeout is the time after lift is commanded to enter a holding load. Time can be entered in milliseconds. FULL LIFT PWM is the maximum level of IGBT switching while in full lift. This value range can be between zero and one hundred percent. Full voltage can be applied from a value of zero to one hundred percent of supply voltage. HOLDING CURRENT is the current maintained after full lift has timed. This value can be entered in amps. The HOLDING PWM is the maximum percentage level of IGBT switch on time while holding load. The PEAK CURRENT is the current at which IGBT switch is cut off in order to maintain a current flow equal to or less than the value entered. This value can be entered in amps.

CLEAN parameters can include CLEAN current, CLEAN PWM, CLEAN timeout, DRIBBLE current, DRIBBLE PWM, and DRIBBLE timeout. CLEAN current is the current maintained to clean the magnet. This value can be entered in amps. The CLEAN PWM is the maximum percentage level of IGBT switch on time while cleaning the magnet. The CLEAN timeout is the time after lift command is removed. Time can be entered in milliseconds. The DRIBBLE timeout is the time after the lift command is removed to reduce the magnet voltage before a clean level. This time can be entered in milliseconds.

VOLTAGE parameters can include SHUTDOWN voltage, DUMP voltage, MINIMUM CAPACITOR voltage, CHARGE-UP DELTA voltage (line-capacitor), and DUMP TEST data. SHUTDOWN voltage is the voltage at which operation control is shutdown. DUMP voltage is the voltage at which the DUMP circuit is turned ON. The MINIMUM CAPACITOR voltage is the minimum voltage of the capacitor bank C1 to pass an initial startup check. The charge-up delta voltage is the maximum, difference between the capacitor bank and the line voltage in order to close the line contactor SW1. The DUMP TEST delta is the level to check the capacitor bank C1 voltage drop with the dump resistor R1 in the circuit.

Some of the above described parameters can be configured to predetermined settings as desired. For example, for voltage settings, the SHUTDOWN voltage can be set to around 425 volts, the DUMP voltage can be set to around 320 volts, the MINIMUM CAPACITOR BANK C1 voltage can be set to around 150 volts, and the CHARGE-UP DELTA voltage can be set to around 100 volts. For current settings, the FULL LIFT current can be set to around 100 amps, the HOLDING current can be set to around 60 amps, the dribble current can be set at zero amps, and the CLEANING current can be set to around 40 amps. For timing settings, the FULL LIFT timeout can be set to around 11000 milliseconds, the CLEANING timeout can be set to around 2000 milliseconds, and the DRIBBLE timeout can be set to around 500 milliseconds. The PEAK CURRENT limit can be set to around 150 amps and the DUMP TEST delta can be set to one count.

The magnet control 100 includes additional components mounted in the housing 110 that can include a microprocessor, a microprocessor interface, contactor drivers, cabling, IGBT drivers, IGBT driver cabling, H-bridge IGBTs, a thermistor, a DUMP IGBT, a DUMP IGBT driver, a diagnostic terminal, a conditioning module, a charge contactor, a charge-up resistor, current sensors, a discharge resistor, control logic, non-volatile and/or volatile memory, an isolated voltage sense circuit, etc.

The solid-state magnet control 100 provides a variety of advantages over conventional magnet controllers. The solid-state construction requires no moving parts and reduces maintenance requirements. The solid-state magnet control 100 can be configured for retrofit or new installations, and can use existing operator controls, existing DC power supplies, and existing D magnet supply connections. The solid-state magnet control 100 improves production efficiency by providing reduced drop time, adjustable dribble time, reduced cleaning time, reduced cycle time, and increased magnet efficiency. The solid-state magnet control 100 provides reduced magnet operating temperature, increased magnet life, increased production efficiency, and greater capacity per lift throughout the shift.

The use of the DUMP circuitry including the DUMP HIGH IGBT5 in the magnet control 100 inhibits circuit damage to the magnet control circuitry 200, the capacitor bank C1, and other components contained within the magnet control 100 caused by overvoltage and/or voltage transients. The use of the DUMP HIGH IGBT5 in combination with the other components of the magnet control circuitry 200 protects the IGBTs in the magnet control circuitry 200 due in large part to the speed in which the DUMP HIGH IGBT5 compensates for overvoltages and/or voltage transients.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

We claim:

1. A magnet control for controlling a magnet during a current flow established by applying a constant voltage, said magnet control comprising:
    a housing;
    magnet control circuitry mounted within the housing, the magnet control circuitry including an insulated gate bipolar transistor (IGBT) bridge configuration, wherein said IGBT bridge configuration comprises a LIFT HIGH IGBT, a LIFT LOW IGBT, a CLEAN HIGH IGBT, and a CLEAN LOW IGBT, wherein the magnet control circuitry controls current passing through the magnet; and
    DUMP circuitry interconnected with the magnet control circuitry, said DUMP circuitry comprises at least a DUMP HIGH IGBT, a discharge diode, and a discharge resistor thereby providing a discharge voltage control circuit,
    wherein the combination of said magnet control circuitry and said DUMP circuitry act to clamp the magnet voltage to a substantially constant value thereby resulting in the magnet current declining at a substantially linear rate whereby a discharge voltage control circuit is achieved.

2. The magnet control according to claim 1, wherein said magnet control circuitry further comprises a capacitor bank.

3. The magnet control according to claim 1, wherein said magnet control is configured to provide power loss ride through.

4. The magnet control according to claim 1, wherein said magnet control is configured to accept increased voltage supply to reduce charge-up time of the magnet.

5. The magnet control according to claim 1, wherein said magnet control is configured to accept existing operator control inputs through a relay interface.

6. The magnet control according to claim 1, wherein said magnet control utilizes categories of LIFT, CLEAN, and voltage parameters.

7. The magnet control according to claim 6, wherein said LIFT parameters include FULL LIFT current, FULL LIFT pulse width modulation (PWM), FULL LIFT timeout, HOLDING current, HOLDING PWM, DRIBBLE current, PEAK current.

8. The magnet control according to claim 6, wherein said CLEAN parameters include CLEAN current, CLEAN pulse width modulation (PWM), CLEAN timeout, DRIBBLE current, DRIBBLE PWM, and DRIBBLE timeout.

9. The magnet control according to claim 6, wherein said VOLTAGE parameters include SHUTDOWN voltage, DUMP voltage, MINIMUM CAPACITOR voltage, CHARGE-UP DELTA voltage, and DUMP TEST data.

10. The magnet control according to claim 1, in combination with a data terminal configured to determine status of a variety of parameters of the magnet control.

11. The magnet control according to claim 1, wherein said magnet control is configured to detect shorted cables.

12. The magnet control according to claim 1, wherein said magnet control is configured to control multiple magnets on a beam.

13. The magnet control according to claim 1, further comprising a battery backup to enable load to be maintained by the magnet upon loss of input voltage.

14. The magnet control according to claim 1, wherein said magnet control is configured to provide ground fault detection.

\* \* \* \* \*